(12) United States Patent
Labrecque et al.

(10) Patent No.: US 6,196,975 B1
(45) Date of Patent: Mar. 6, 2001

(54) METHOD AND SYSTEM FOR DETECTING ESTRUS IN SWINE

(76) Inventors: Robert Labrecque, 999, rue St-Georges; Germain Labrecque, 1014, rue St-Georges, both of St-Bernard de Dorchester, Qc (CA), G0S 2G0

( * ) Notice: Subject to any disclaimer, the term of this patent is extended or adjusted under 35 U.S.C. 154(b) by 0 days.

(21) Appl. No.: 09/299,964

(22) Filed: Apr. 26, 1999

(30) Foreign Application Priority Data

Feb. 25, 1999 (GB) .................................................. 9904199

(51) Int. Cl.⁷ ........................................................ A61B 5/00
(52) U.S. Cl. .......................... 600/551; 119/453; 119/455; 119/472
(58) Field of Search ................................... 600/551, 591; 119/416, 452, 453, 455, 472–474

(56) References Cited

U.S. PATENT DOCUMENTS

| | | | | |
|---|---|---|---|---|
| 3,785,344 | * | 1/1974 | Patterson | 119/17 |
| 4,171,682 | * | 10/1979 | Merino et al. | 119/15 |
| 4,533,008 | * | 8/1985 | Ostermann | 177/132 |
| 5,113,793 | * | 5/1992 | Leader et al. | 119/453 |
| 5,653,194 | * | 8/1997 | Guy | 119/453 |

\* cited by examiner

*Primary Examiner*—Max Hindenburg
(74) *Attorney, Agent, or Firm*—Eric Fincham (57) ABSTRACT

There is provided a moveable cart for use in transporting a male hog past one or more rows of cages containing sows to permit the determination of estrus in the sows and also to increase the success rate during artificial insemination by permitting snout to snout contact between the sow and male hog, the cart having a base with wheels mounted thereon, at least one wall extending upwardly from the base, and at least one panel for blocking visual access in at least one direction between the interior and exterior of the cart and at least one opening in the wall sized to permit the snout of the male hog to at least partially extend therethrough.

29 Claims, 13 Drawing Sheets

Fig. 13

METHOD AND SYSTEM FOR DETECTING ESTRUS IN SWINE

METHOD AND SYSTEM FOR DETECTING ESTRUS IN SWINE

The present invention relates to the field of animal husbandry and in particular, relates to a moveable cart suitable for use in a hog rearing operation and to improvements in such operations and methods associated therewith.

BACKGROUND OF THE INVENTION

In hog rearing operations, it has become essential to maximize the reproductive capacity of the sows. Originally, many hog raising operations simply relied on letting nature take its course with impregnation of the sow by the male hog. However, with larger operations, it became necessary to increase the reliability and accordingly, artificial insemination has been widely practised.

In order for artificial insemination to work efficiently and economically, it is necessary to administer the semen at the time when estrus is occurring. Typically, semen is administered between 1 and 4 times during estrus in predetermined spaced apart time intervals.

It has been proposed in the art to use instrumentation to attempt to determine estrus. Typically, there have been proposed various types of temperature sensors and probes insertable into the vaginal canal for detecting either an increase in temperature or increase in current flow through the mucous. Although these methods do work, they are both time and labour intensive and increase the risk of mortality through contamination, infection, etc.

More traditionally, the techniques employed on the modem day farm is to circulate a male hog down a row of cages containing the sows.

Despite all the advances in the art, typically the impregnation success ratio (i.e. the number of sows successfully impregnated) is in the area of between 75% to 85%. While these rates represent a vast improvement over older success rates, it is obviously desirable to further increase the rate.

SUMMARY OF THE INVENTION

It is an object of the present invention to provide a method for the artificial insemination of sows.

It is a further object of the present invention to provide a moveable cart which may be used in a hog rearing operation to assist in determining estrus and improving the success rate of artificial insemination.

According to one aspect of the present invention, there is provided a moveable cart suitable for use on a hog farm, the moveable cart comprising a base, the base having wheels mounted thereon; at least one wall extending upwardly from the base; means associated with the at least one wall for blocking visual access in at least one direction between the interior and exterior of the cart; and at least one opening in the at least one wall sized to permit a snout of a hog to at least partially extend therethrough.

According to a further aspect of the present invention, there is provided a process of determining estrus in sows, each sow being enclosed in one of an aligned row of cages wherein the heads of all sows are aligned at one end of the cages, the improvement comprising the step of placing a male hog in a moveable cart, the cart having an opening in a side wall thereof, and moving the cart along the one end of the cages while permitting the male hog to have snout to snout contact with a sow.

According to a further aspect of the present invention, there is provided a process of artificial insemination of a sow wherein a plurality of sows are each enclosed in an individual cage, the cages being aligned, and wherein the heads of all sows are aligned at one end of the cages, the improvement comprising the step of placing a male hog in a moveable cart, the cart having an opening in a side wall thereof, and moving the cart along the one end of the cages, and permitting the male hog to have snout to snout contact with the sow during the step of artificial insemination.

The moveable cart of the present invention may take several forms. The cart may be formed as a single unitary cart of a rectangular configuration although, in a preferred embodiment, the cart is formed of two sections which are hingedly connected together. This arrangement is advantageous for movement in close quarters wherein one of the hinged connections may be undone such that the cart may move around a corner in a very short radius.

The cart is preferably motor driven although a hand pushed cart incorporating the features of the present invention could also be employed. The cart is preferably driven by an electric motor of a suitable voltage which in turn may be powered by a suitable non-explosive rechargeable battery. Alternatively, a 120 volt AC connection could be employed. Preferably, the cart is capable of being driven in both directions and even more preferably, is capable of being remotely controlled.

One of the advantageous features of the present invention is the provision of means to prevent the male hog from lying down in the cage. Such means may conveniently comprise a member extending underneath the hog to prevent such occurrences. Such a member may extend either transversely or longitudinally of the cart.

Preferably, the cart includes means for obstructing the vision from one end and one side thereof. Such an arrangement is advantageous in that the male hog can then only focus on a single cage containing a single sow. Preferably, the panels are removable and may be placed on either side/end of the cart.

Similarly, the cart is designed to permit snout to snout contact between the male hog and the sow. To do so, the space between the bars may be sufficient to permit such snout to snout contact or in a preferred embodiment, a portion of the wall is designed with removable bars such that the access opening may be enlarged or diminished as appropriate.

The cart is made of suitable materials to preferably be resistant to corrosion and to ensure proper sanitation.

One particular arrangement of the cart calls for centrally mounted wheels which permits the shortest turning radius for the cart. Preferably, such wheels are pneumatic and the air pressure may be varied depending on the load. Thus, additional support wheels at the corners of the moveable cart may be provided and the centre pneumatic wheels would have the pressure adjusted, depending upon the load, such that the cart is level.

In the improvement in the process of determining estrus, the cart may be moved past the heads of sows which are in aligned cages. At the same time, a worker placed at the rear of the sows can manoeuver the cart and using conventional techniques, determine whether the sow is entering estrus. It has been found that permitting the snout to snout contact assists in the determining of estrus.

Similarly, during the process of artificial insemination, the manoeuvring of the cart to each sow which is undergoing artificial insemination to permit snout to snout contact has been found to be extremely beneficial. It has been found that in so doing, success rates in artificial insemination have been as high as 95% compared to traditional figures of 85% or less.

BRIEF DESCRIPTION OF THE DRAWINGS

Having thus generally described the invention, reference will be made to the accompanying drawings illustrating an embodiment thereof, in which.

DESCRIPTION OF THE PREFERRED EMBODIMENTS

Figure 1:
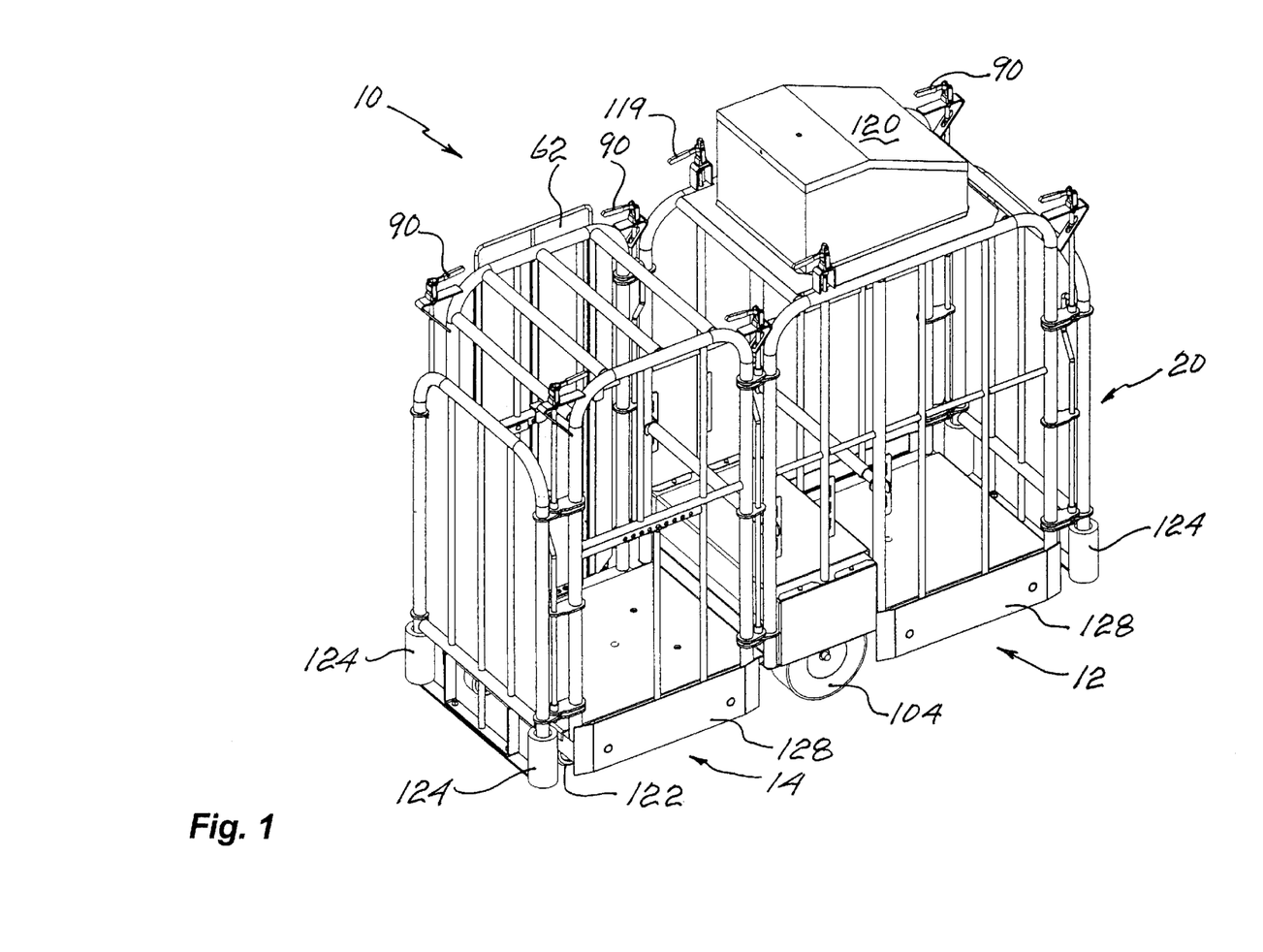
FIG. 1 is a perspective view of a cart according to one embodiment of the present invention.

Referring to the drawings in greater detail and by reference characters thereto, there is illustrated in FIG. 1 a moveable cart according to the present invention and which cart is generally designated by reference numeral 10. Removable cart 10 has a first cart section generally designated by reference numeral 12 and a second cart section generally designated by reference numeral 14.

First cart section 12 includes a first side wall 16 and an opposed side wall 18 with an end wall/door 20 located therebetween at one end. Thus, as may be best seen in FIG. 6, there is provided a first cart section 12 which has an open end opposed to end wall/door 20.

Side walls 16 and 18 are similar and thus only will be described in detail herein, with similar reference numerals with a prime being used for similar components on side wall 18. Side wall 16 includes an upper frame member 22 which is connected to side frame members 24 and 26. Intermediate side frame members 24 and 26 are a plurality of vertical bars 28 while a horizontal bar 30 extends between side frame members 24 and 26.

Figure 3:
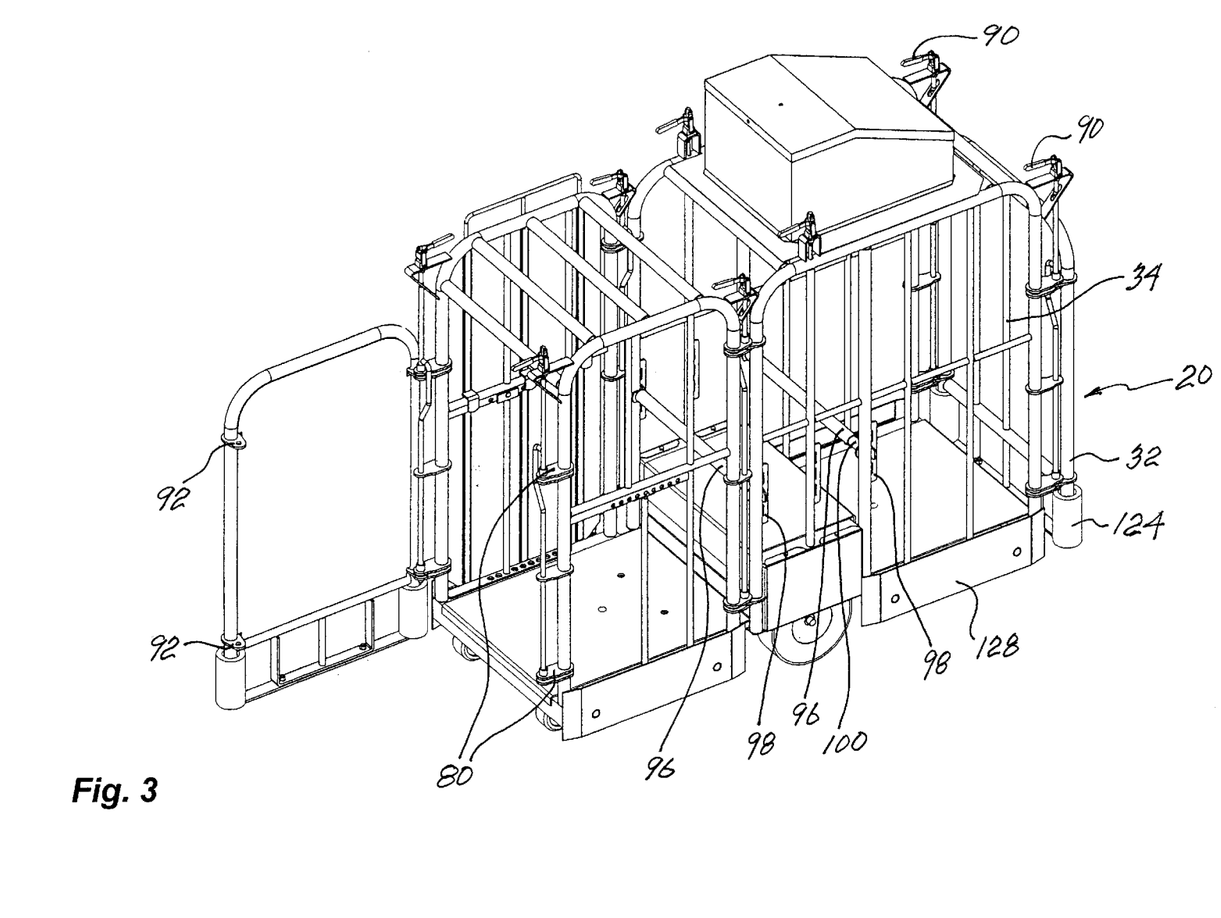
FIG. 3 is a perspective view, similar to FIG. 1, illustrating a cart with one of the end doors in an open position.
Figure 4:
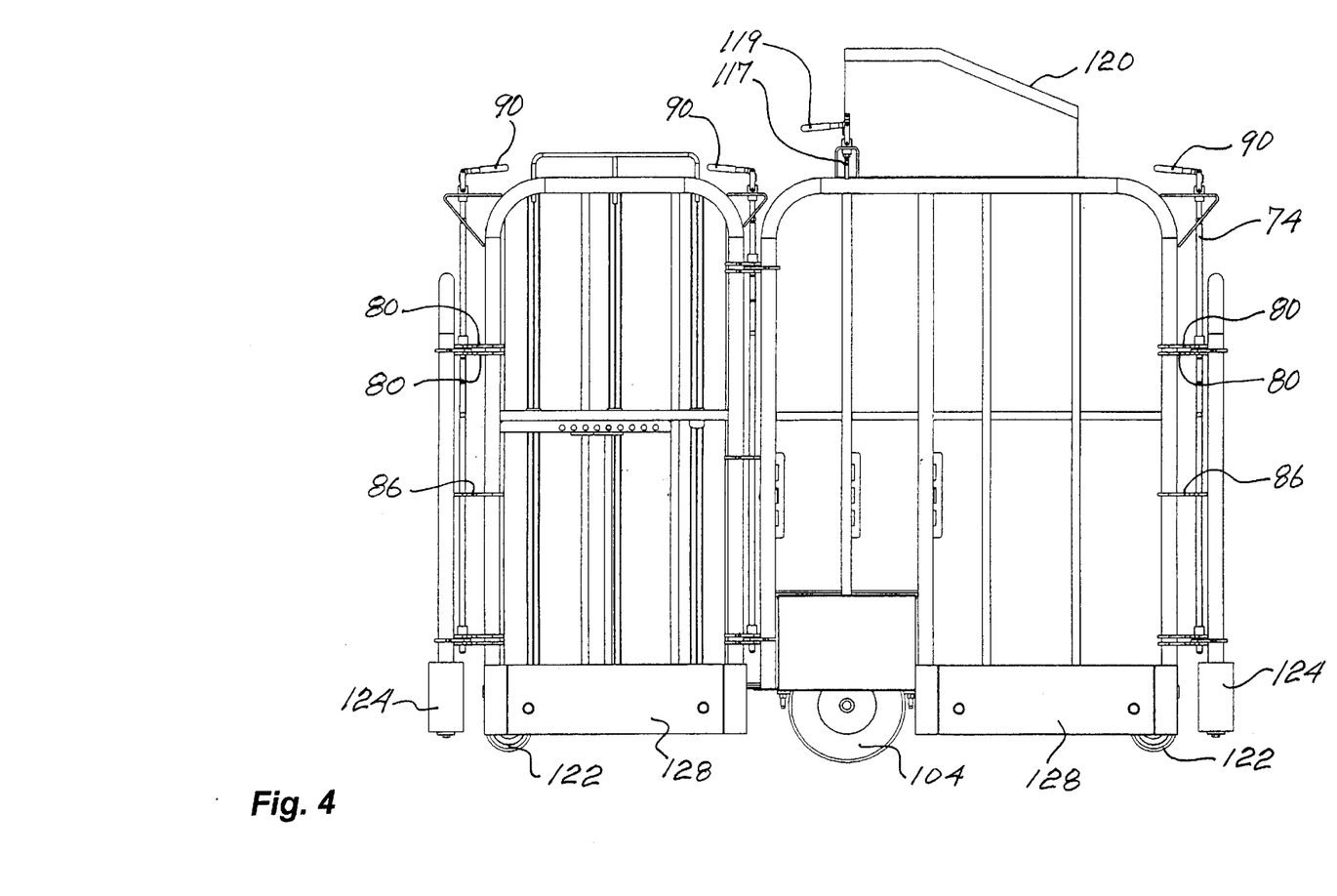
FIG. 4 is a side elevational view of the cart of FIG. 1.

End door 20, as may be best seen in FIG. 3, includes a U-shaped frame 32 having a plurality of vertical bars 34 extending between the side frame portions thereof.

Forming a portion of first cart section 12 is a drive compartment generally designated by reference numeral 36 and which will be described in greater detail hereinbelow.

Figure 5:
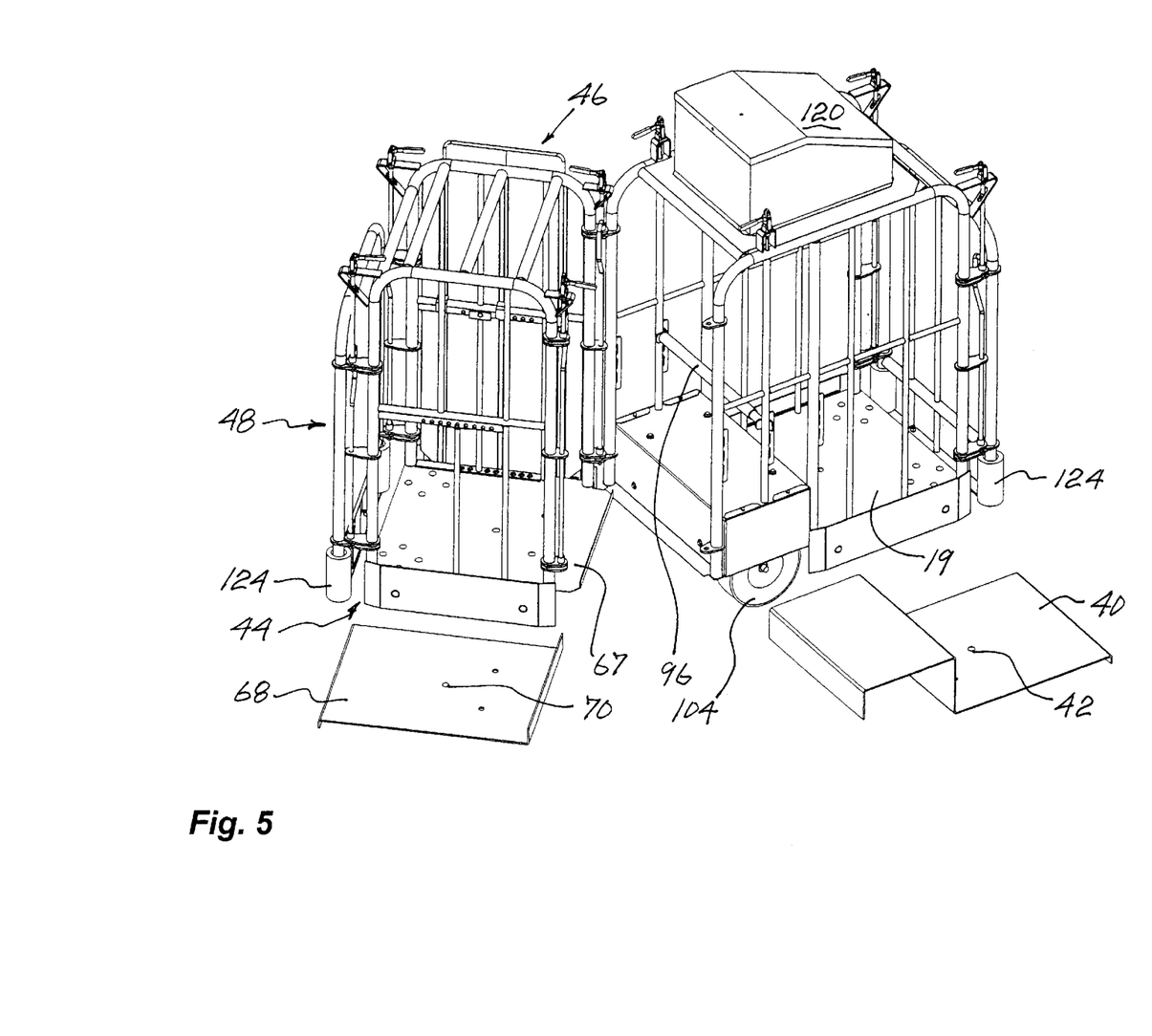
FIG. 5 is a perspective view of the cart of FIG. 1 in a partially open configuration for negotiating tight spaces and also showing the removable floor pans.

As may be best seen in FIG. 5, first cart section 12 includes a sub-floor 19 which is preferably of a stainless steel with a final finished floor 40 superimposed thereon. Floor 40 is preferably of a relatively thick aluminum and is formed to be anti-slip and assure the comfort of the animal within. Drainage apertures 42 are provided in both sub-floor 19 and finished floor 40.

As shown in FIG. 5, second cart section 14 includes a first side wall 44 and opposed side wall 46 with an end wall/door 48 therebetween to thereby define an open ended cage section.

Figure 6:
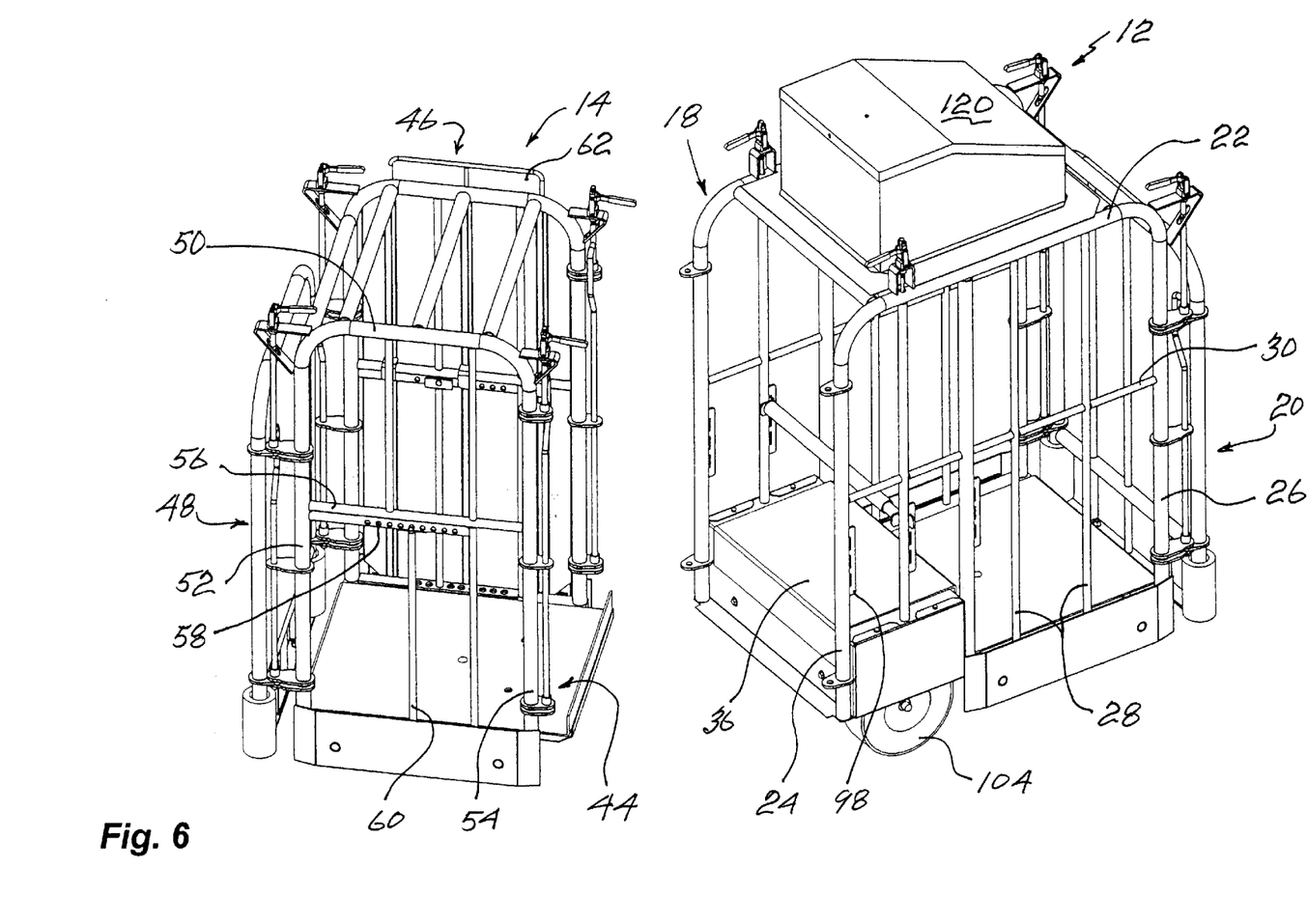
FIG. 6 is a perspective view similar to FIG. 5 showing a section of the cart detached from the main portion thereof.
Figure 7:
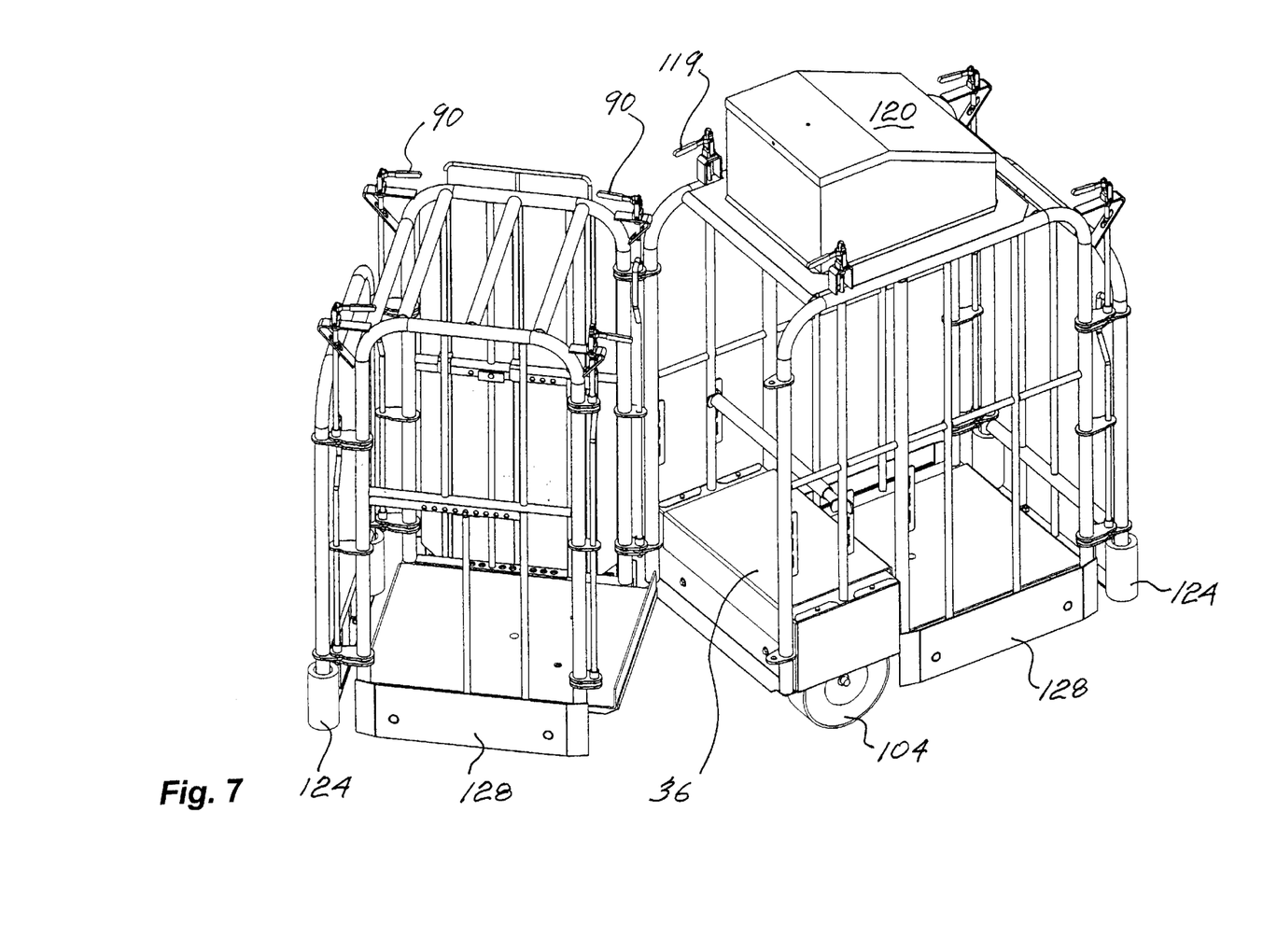
FIG. 7 is a perspective view of the cart of FIG. 1 in a partially open position.

Side wall 44 and side wall 46 are similar and thus only one will be described in detail herein. Side wall 44, as seen in FIG. 6, includes an upper horizontal frame member 50 from which extend downwardly side frame members 52 and 54. A horizontal frame member 56 extends between side frame members 52 and 54 with a plurality of apertures 58 being formed therein as well as in the bottom horizontal frame member. A plurality of vertical bars 60 are fitted within apertures 58 and may be inserted/removed as required to provide an adjustably sized access opening to the second cart section 14.

Figure 2:
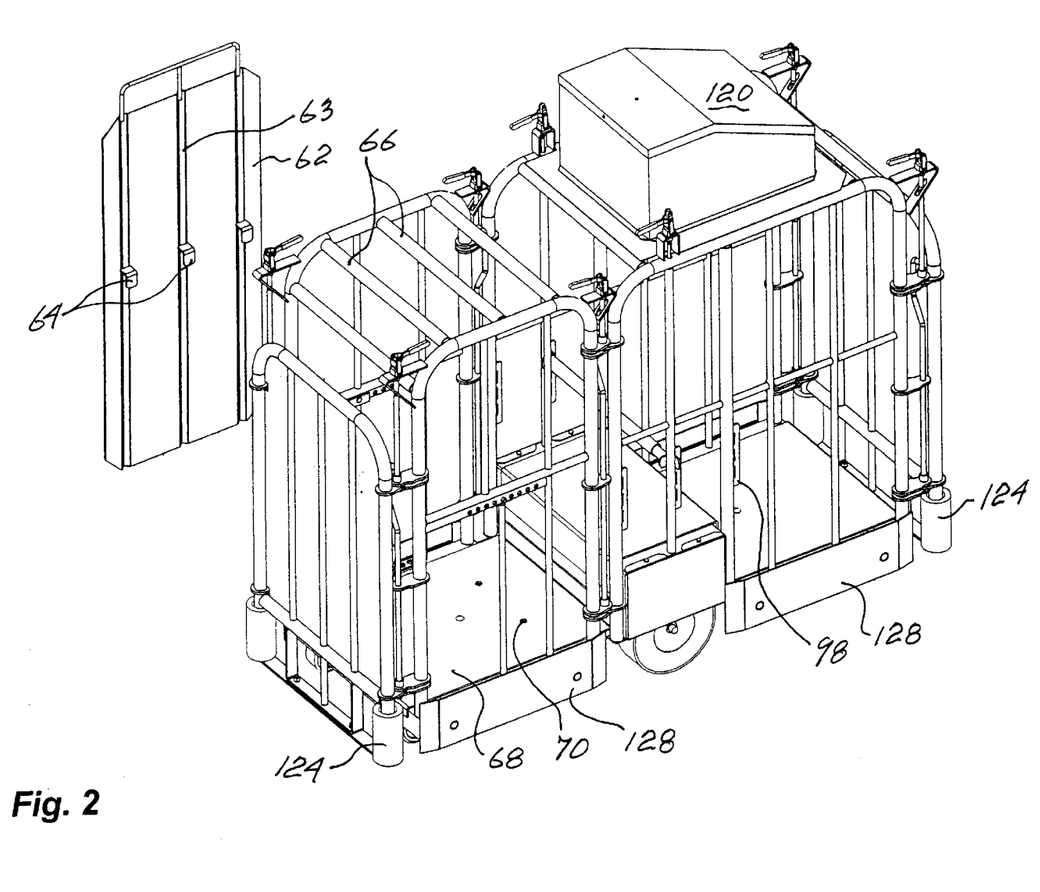
FIG. 2 is a perspective view similar to FIG. 1 illustrating the attachment of a side panel to a portion of the cart.

Opaque panels such as shown in FIGS. 2, 5 and 6 may be utilized to prevent visual access from within the cart. Panels 62 may include a plurality of L-shaped hooked members 64 for securing the same to horizontal bar 56 as well as a locking pin 63 (FIG. 2). Second cage section 14 also includes a plurality of ceiling frame members 66. In a manner similar to that described with respect to first cart section 12, there is provided a stainless steel sub-floor 67 and a finished aluminum floor 68, each having drainage apertures 70 formed therein.

There are provided attachment means which are generally designated by reference numeral 72 and which are utilized for joining the two cart sections together and also for securing the end wall/doors 20 and 48. This mechanism may best be seen in FIGS. 13 and 3 and reference will now be made thereto.

Figure 13:
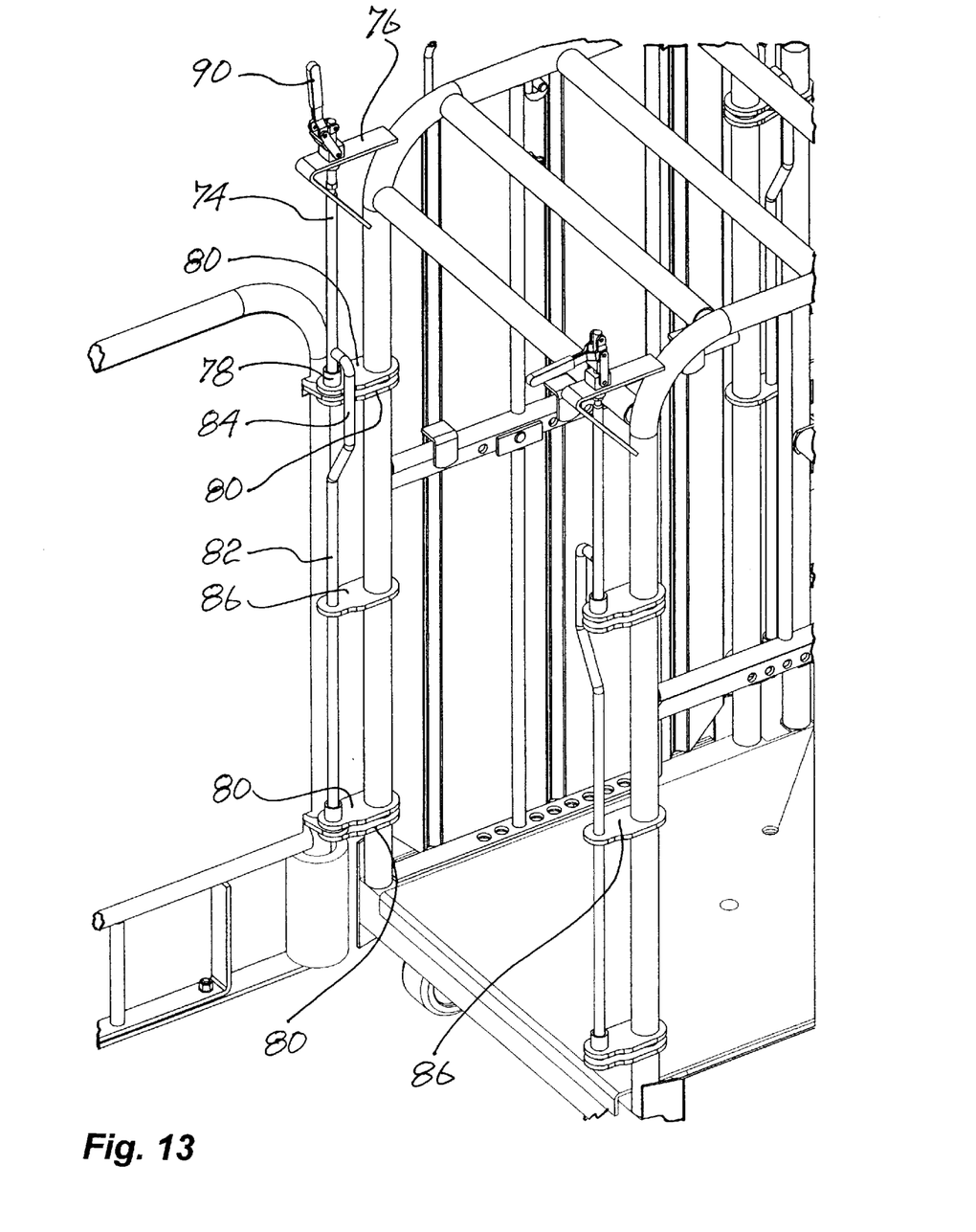
FIG. 13 is a partial perspective view showing in detail the means for connecting sections of the cart together and door latching mechanisms.

Attachment means 72 includes an upper rod section 74 which is mounted to a V-shaped support 76 suitably secured to a frame member as required. Extending outwardly from the vertical frame members are a pair of flanges 80 which are slightly spaced apart. A pair of lower flanges are also provided (FIG. 13). Sleeve inserts 78 may be provided therein.

A lower vertical rod section 82 is connected to upper rod section 74 by a connecting section 84. There is also provided an intermediate support flange 86.

Mounted on the vertical frame of the portion to be joined are a pair of flanges or plates 92 which are designed to fit within the space between flanges 80. Rod sections 74 and 82 may then be operated to fit within aperture flanges 80 and plate 92 to retain the two assembled together in a pivotable manner. An upper lever 90 may be used to move the rod sections 74 and 82 as required.

The same mechanism is provided at the corners where the first cart section and second cart section 14 are to be joined as well as where end wall/doors 20 and 48 are secured. With this arrangement, the doors and sections may be either pivoted with respect to one another and/or completely removed as shown in the different configurations in the drawings.

Figure 8:
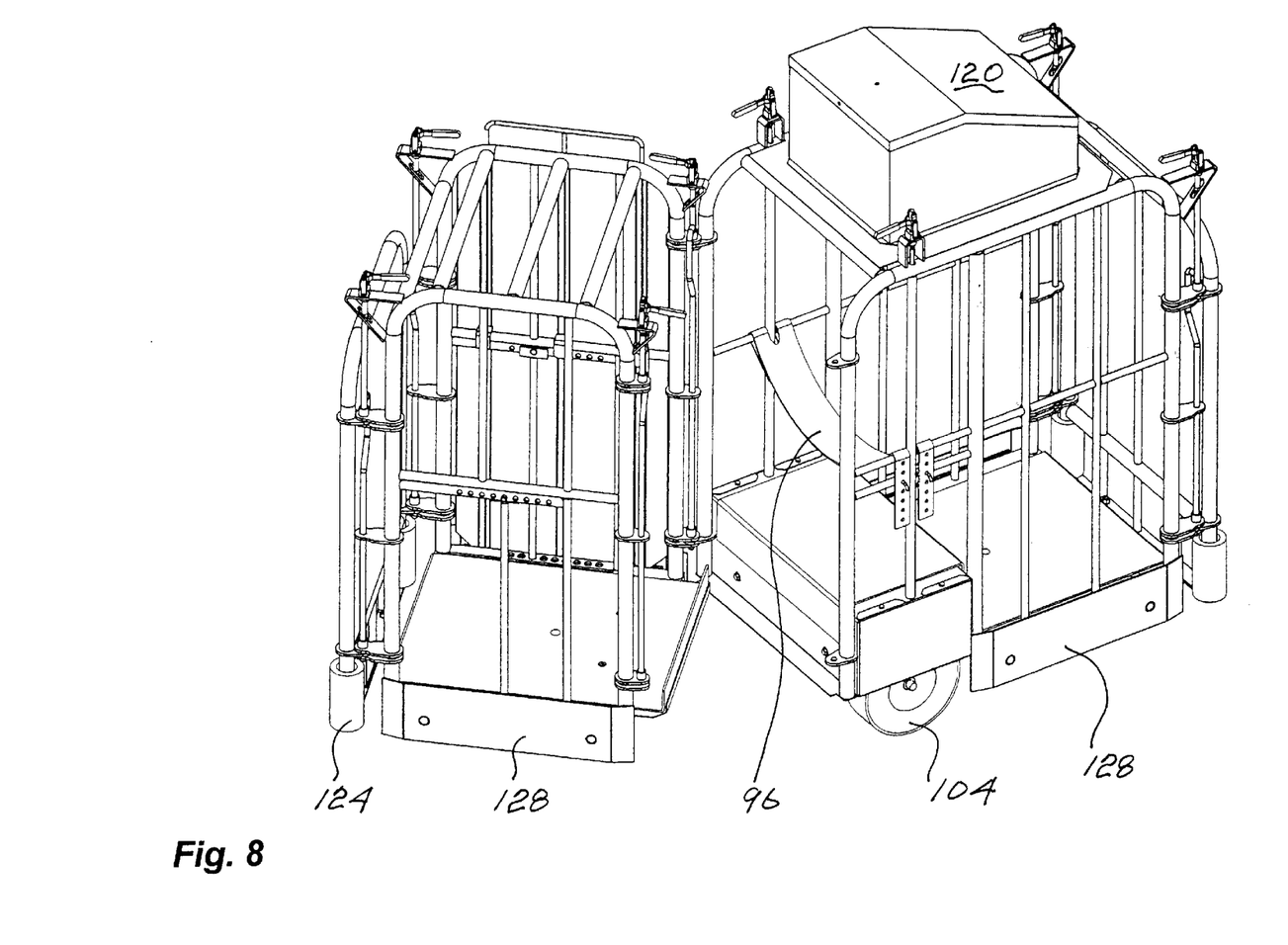
FIG. 8 is a perspective view similar to FIG. 7, but showing an alternative restraining component within the cage.

Within first cart section 12, there are provided a pair of hog positioning members generally designated by reference numeral 96 and which each comprise a bar designed to extend across between side walls 16 and 18. Retaining members 98 are mounted on the vertical bars 28 and provide for variable location of the hog positioning members 96. In this respect, hog positioning members 96 may utilize a spring loaded telescoping inner bar 100 in a known manner.

Figure 9:
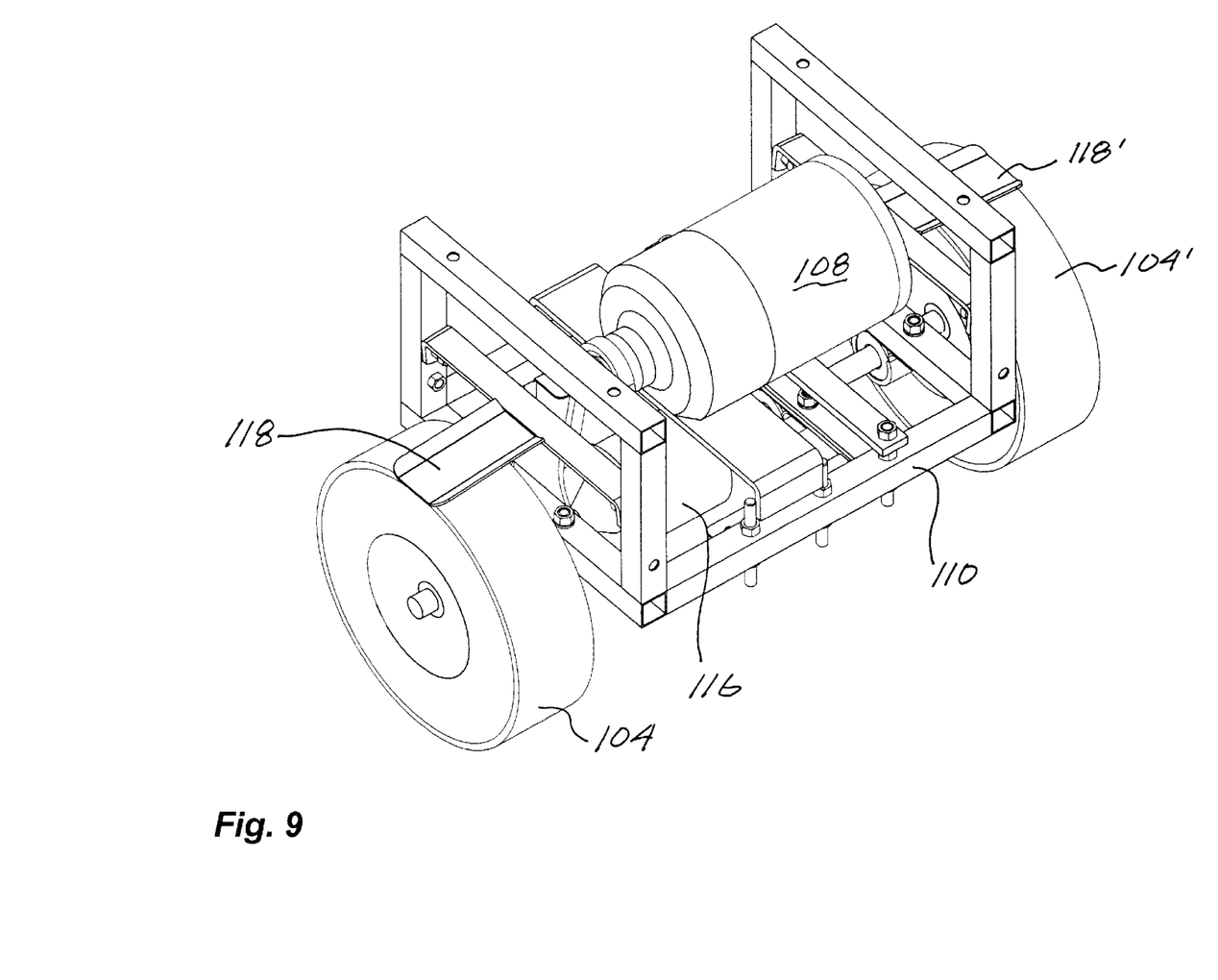
FIG. 9 is a partial perspective view, with portions removed, of a drive unit of the cart of FIG. 1.
Figure 10:
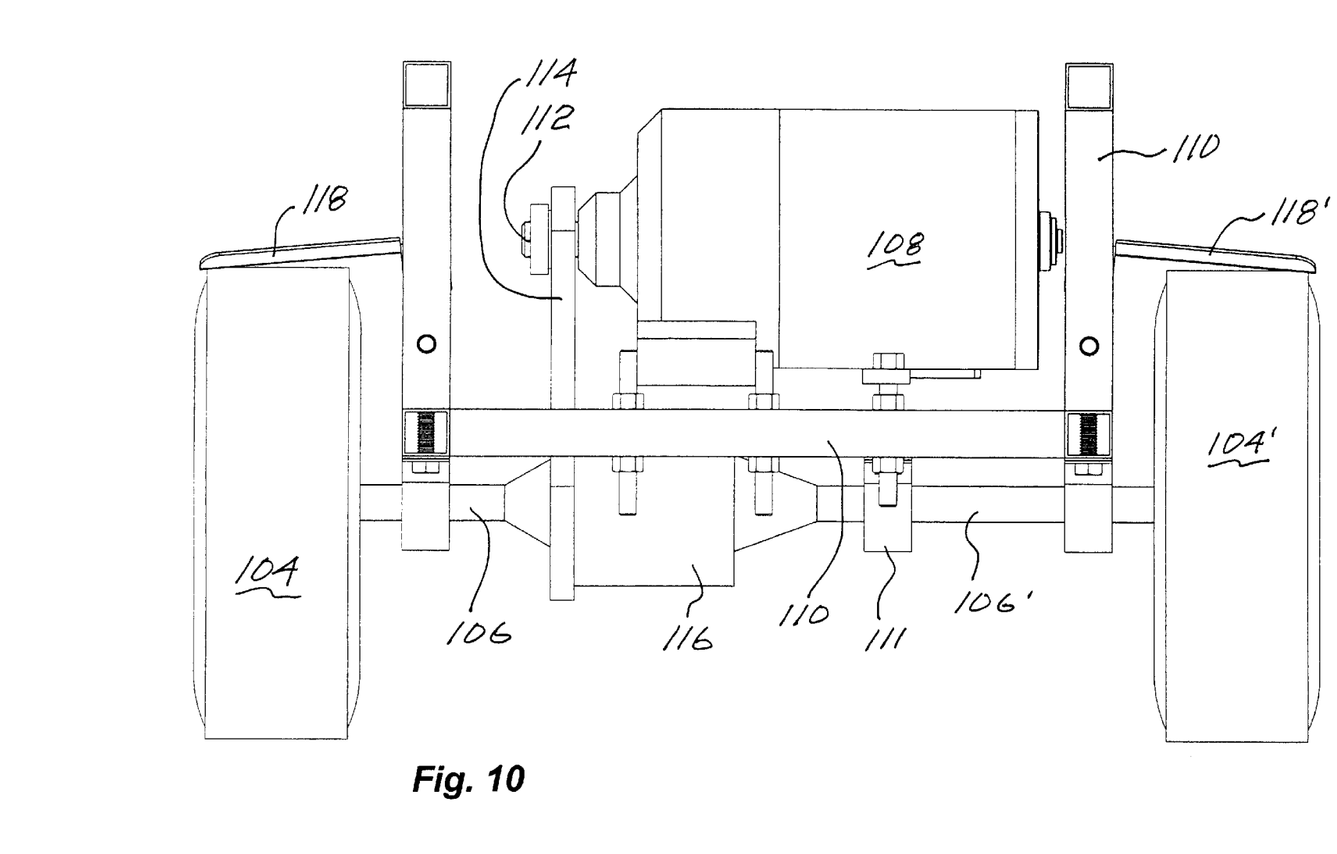
FIG. 10 is side elevational view of the drive unit illustrated in FIG. 9.
Figure 11:
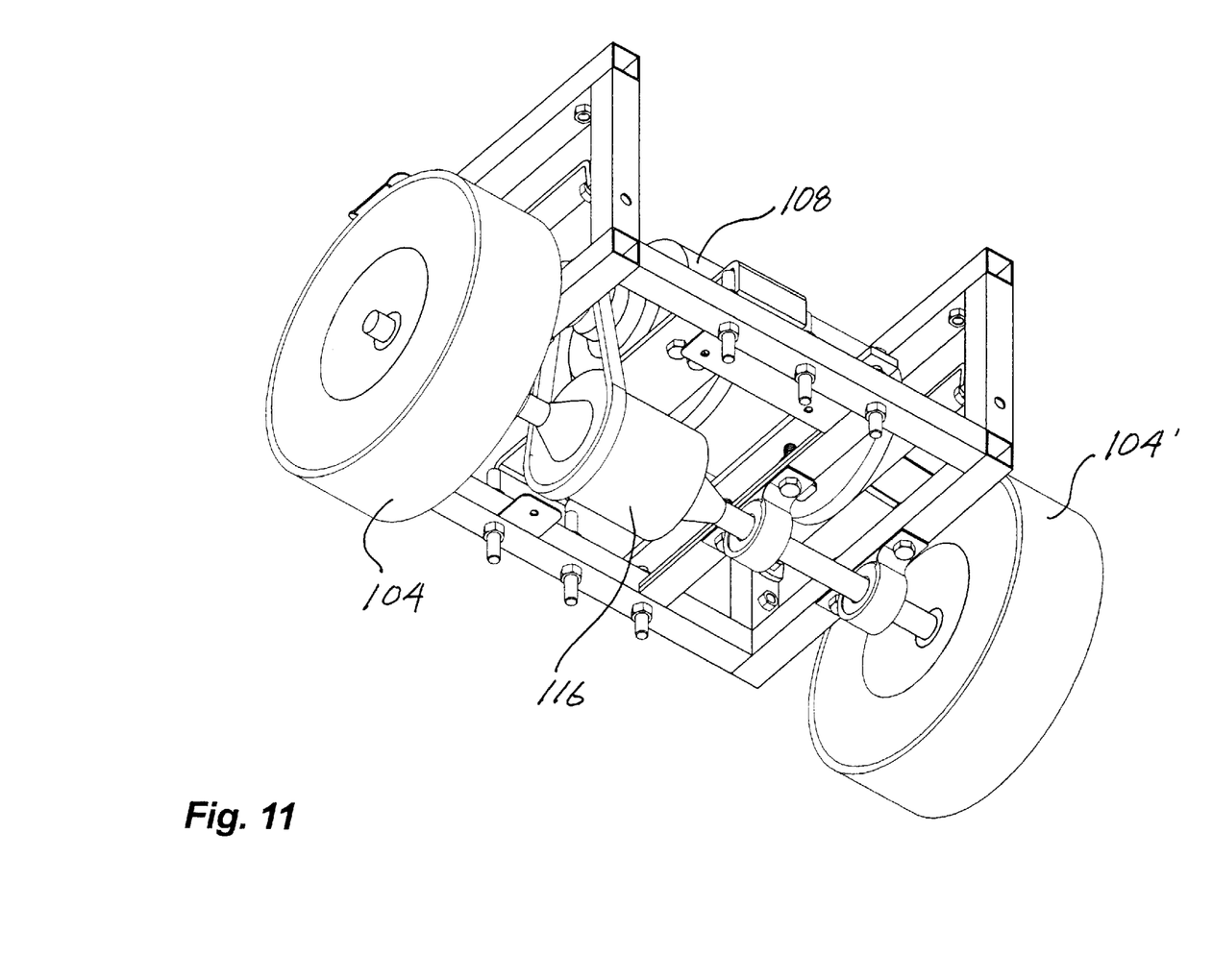
FIG. 11 is a bottom perspective view of the drive unit and components thereof.

Mounted below drive compartment 36 is a pair of wheels, 104, 104' mounted on axles 106, 106' respectively. An electric motor 108 is mounted on a suitable support frame 110. Axle 106 may carry a ball bearing support for 111 for support axle 106'. Wheels 104 and 104' are preferably pneumatic and the pressure therein may be adjusted according to the weight of the cart and contents.

Electrical motor 108 is designed to drive a pulley 112 having a belt 114 entrained thereabout and which is operatively connected to a differential 116.

For braking purposes and also for turning, there are provided a pair of braking members 118 which may be selectively operated on either one of the wheels to provide for a turning capability or on both wheels. Braking members 118 are connected to rods 117, which extend upwardly to handles 119 for activation. Thus, the braking of one of the wheels will provide a turning moment about that wheel to therefore provide for maximum manoeuverability.

Mounted on top of first case section 12 is a housing 120 which may be utilized to house the various controls. In this respect, the cart is preferably driven by a suitable remote control utilizing known circuitry. Also preferably provided are speakers which may be housed within housing 120.

Figure 12:
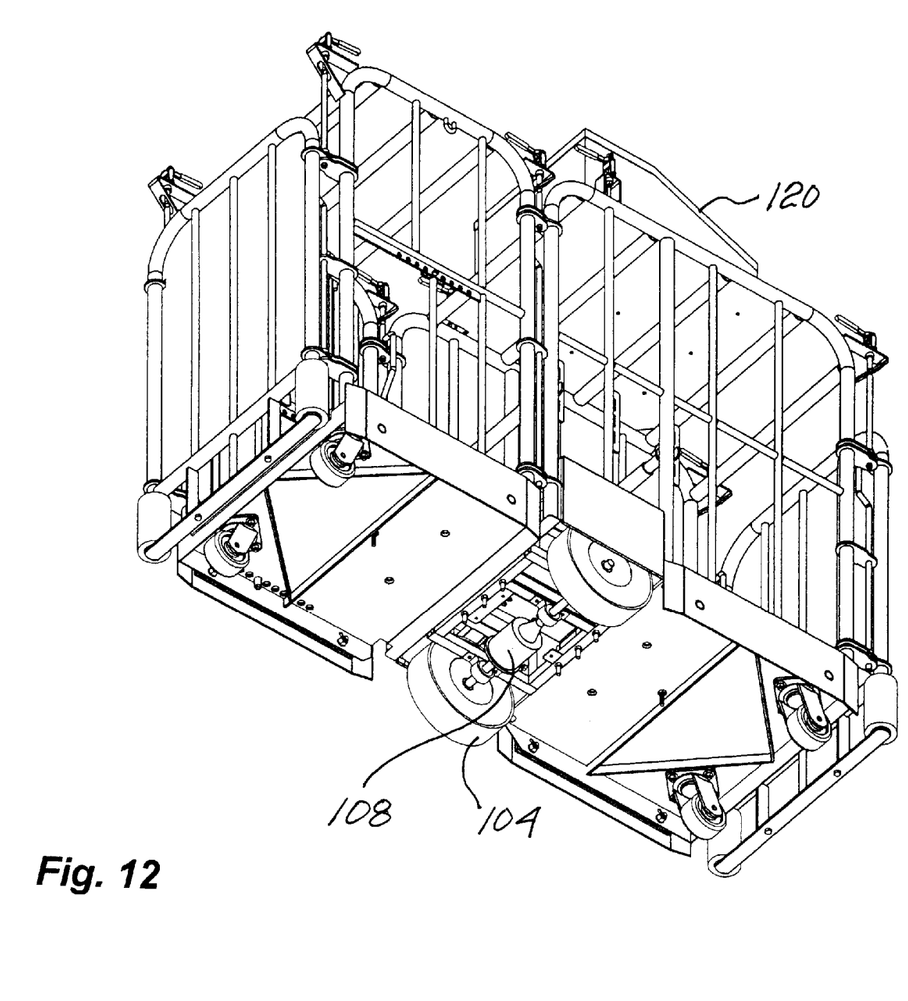
FIG. 12 is a bottom perspective view of the cart of FIG. 1.

For ease of movement, the cart is provided with support wheels 122 situated at the corners of the first cart section 12 and second cart section 14. There are also provided bumper rollers 124 at respective corners of the cart 10. In addition, there are provided abutment plates 128 situated at the lower portions of each side of first cart section 12 and second cart section 14. Abutment plates 128 are adapted to contact edges of the path followed by cart 10 - i.e. the cart, particularly when it is being driven by means of the remote control, may utilize the abutment plates as the cart moves along the edge of the various cages.

Electric motor 108 is preferably a DC motor and powered by a rechargeable non-explosive battery. The control system may include a safety system such that upon a predetermined resistance, the drive is cut off. This would prevent any accidental crushing of any object in the path of the cart. As will be appreciated, in any building wherein several such carts may be utilized, each cart would operate on a different frequency for the remote control.

The remote control cart is highly suitable for practice of the method of the present invention. Thus, a single worker will be located preferably at the rear of the individual cages for the sows and able to remotely control the cart as it moves from cage to cage for purposes of both determining estrus and for purposes of artificial insemination.

It will be understood that the above described embodiments are for purposes of illustration only and that changes and modifications may be made thereto without departing from the spirit and scope of the invention.

We claim:

1. A moveable cart suitable for use on a hog farm, the moveable cart comprising:
   a base, said base having wheels mounted thereon;
   at least one wall extending upwardly from said base;
   means associated with said at least one wall for blocking visual access in at least one direction between the interior and exterior of said cart;
   at least one opening in said at least one wall sized to permit a snout of a hog to at least partially extend therethrough; and
   hog positioning means within said cart to prevent a hog from lying down in said cart.

2. The cart of claim 1 wherein said at least one wall comprises first and second opposed side walls and first and second opposed end walls, and means for securing said side walls and end walls together.

3. The cart of claim 2 wherein each of said first and second end walls is hingedly connected to an adjacent side wall.

4. The cart of claim 2 wherein each of said walls is comprised of a plurality of spaced apart bars.

5. The cart of claim 1 wherein said means for blocking visual access comprises at least one panel of an opaque material, and means for attaching said panel to said at least one wall.

6. The cart of claim 1 further including means for adjusting the size of said at least one opening in said at least one side wall.

7. The cart of claim 6 wherein said means for adjusting the size of said at least one opening comprises a plurality of removable bars mounted proximate said base.

8. The cart of claim 1 wherein said cart comprises a first cart section and a second cart section, said first cart section including a first base section forming a portion of said base, and a first cart section wall extending upwardly from said first base section to define a first enclosure having an open end, said second cart section having a second base section forming a portion of said base and a second cart section wall extending upwardly from said second base section to define a second enclosure having one open side, and means for securing said first cart section and said second cart section together such that said open sides are in alignment and said first cart section and said second cart section together define an enclosed cart.

9. The cart of claim 1 further including drive means for moving said cart from one location to a second location.

10. The cart of claim 9 further including remote control means operatively associated with said drive means.

11. The cart of claim 1 wherein said wheels comprise first and second pneumatic tires mounted centrally of said cart.

12. The cart of claim 11 further including support wheels mounted at each corner of said cart.

13. The cart of claim 2 wherein said hog positioning means within said cart comprises a member extending between said first and second opposed sides, said member being positioned to be under a hog when a hog is in the cart.

14. The cart of claim 8 wherein said first cart section and said second cart section are hingedly secured together.

15. The cart of claim 1 further including sound emitting means on said cart.

16. In a process of determining estrus in sows, each sow being enclosed in one of an aligned row of cages wherein the heads of all sows are aligned at one end of said cages, the improvement comprising the step of placing a male hog in a moveable cart, said cart having an opening in a side wall thereof, and moving said cart along said one end of said cages while permitting said male hog to have snout to snout contact with a sow.

17. In a process of artificial insemination of a sow wherein a plurality of sows are each enclosed in an individual cage, said cages being aligned, and wherein the heads of all sows are aligned at one end of said cages, the improvement comprising the step of placing a male hog in a moveable cart, said cart having an opening in a side wall thereof, and moving said cart along said one end of said cages, and permitting said male hog to have snout to snout contact with said sow during the step of artificial insemination.

18. A moveable cart suitable for use on a hog farm, the moveable cart comprising:

a base, said base having wheels mounted thereon;

at least one wall extending upwardly from said base;

means associated with said at least one wall for blocking visual access in at least one direction between the interior and exterior of said cart, said means for blocking visual access comprising at least one panel of an opaque material, and means for attaching said panel to said at least one wall; and at least one opening in said at least one wall sized to permit a snout of a hog to at least partially extend therethrough.

19. The cart of claim 18 wherein said cart comprises a first cart section and a second cart section, said first cart section including a first base section forming a portion of said base, and a first cart section wall extending upwardly from said first base section to define a first enclosure having an open end, said second cart section having a second base section forming a portion of said base and a second cart section wall extending upwardly from said second base section to define a second enclosure having one open side, and means for securing said first cart section and said second cart section together such that said open sides are in alignment and said first cart section and said second cart section together define an enclosed cart.

20. A moveable cart suitable for use on a hog farm, the moveable cart comprising:

a base, said base having wheels mounted thereon;

at least one wall extending upwardly from said base;

means associated with said at least one wall for blocking visual access in at least one direction between the interior and exterior of said cart; and at least one opening in said at least one wall sized to permit a snout of a hog to at least partially extend therethrough, and means for adjusting the size of said at least one opening comprising a plurality of removable bars mounted proximate said base.

21. The cart of claim 20 wherein said cart comprises a first cart section and a second cart section, said first cart section including a first base section forming a portion of said base, and a first cart section wall extending upwardly from said first base section to define a first enclosure having an open end, said second cart section having a second base section forming a portion of said base and a second cart section wall extending upwardly from said second base section to define a second enclosure having one open side, and means for securing said first cart section and said second cart section together such that said open sides are in alignment and said first cart section and said second cart section together define an enclosed cart.

22. The cart of claim 20 wherein said means for blocking visual access comprises at least one panel of an opaque material, means for attaching said panel to said at least one wall.

23. A moveable cart suitable for use on a hog farm, the moveable cart comprising a base, said base having wheels mounted thereon, said cart having a first cart section and a second cart section, said first cart section including a first base section forming a portion of said first base, and a first cart section wall extending upwardly from said first base section to define a first enclosure having an open end, said second cart section having a second base section forming a portion of said base and a second cart section wall extending upwardly from said second base section to define a second enclosure having one open side, and means for securing said first cart section and said second cart section together such that when said open sides are in alignment, said first cart section and said second cart section together define an enclosed cart, and at least one opening in said at least one wall is sized to permit a snout of a hog to at least partially extend therethrough.

24. The moveable cart of claim 23 wherein said first cart section and said second cart section are hingedly connected together to permit articulated movement.

25. The moveable cart of claim 23 wherein each of said walls is comprised of a plurality of spaced apart bars.

26. The moveable cart of claim 23 further including guide means extending outwardly from said cart to guide said cart along the edge of cages.

27. A moveable cart suitable for use on a hog farm, said moveable cart comprising a base, said base having wheels mounted thereon, at least one wall extending upwardly from said base, at least one opening in said at least one wall sized to permit a snout of a hog to at least partially extend therethrough, drive means for moving said cart from one location to a second location, and guide means extending outwardly from said cart to guide said cart along a series of cages.

28. The moveable cart of claim 27 wherein said guide means comprise rotatable means mounted on a side of said cart to guide said cart along.

29. In a process of artificial insemination or determining estrus in sows wherein a plurality of sows are each enclosed in an individual cage, said cages being aligned, where the heads of all sows are aligned at one end of said cages, the improvement comprising the step of placing a male hog in a moveable cart, said cart having an opening in a side wall thereof, said cart having drive means and remote control means, and moving said cart along said one end of said cages by means of said remote control while permitting said male hog a snout to snout contact with a sow.

* * * * *